Feb. 7, 1939.        R. BERKOWITZ        2,146,559
METHOD OF MANUFACTURING HOSE
Original Filed Jan. 19, 1933

INVENTOR
Robert Berkowitz
BY
ATTORNEY

Patented Feb. 7, 1939

2,146,559

UNITED STATES PATENT OFFICE 2,146,559

METHOD OF MANUFACTURING HOSE

Robert Berkowitz, Brooklyn, N. Y., assignor to Metal Hose & Tubing Co., Inc., Brooklyn, N. Y., a corporation of New York Original application January 19, 1933, Serial No. 652,460. Divided and this application October 19, 1933, Serial No. 694,217

6 Claims. (Cl. 154—8)

This invention relates to a method of manufacturing hose, being a method which is particularly, though not exclusively, adapted for the manufacturing of a gasoline hose such as is disclosed and claimed in application Serial No. 652,460 Patent No. 2,079,598, of which this is a division.

An object of the invention is to provide an improved method for the manufacturing of hose.

A further object is to provide an improved method for the manufacturing of a hose which will have its rubber portions suitably protected against the deteriorating effects of such liquids, for instance solvent hydro-carbon fluid, as the hose may be used to convey.

A further object is to provide an improved method by which to produce a practical and efficient gasoline proof hose.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawing which is to be taken as a part of this specification, and in which the essential steps of procedure are clearly disclosed:

Figs. 1, 2, 3 and 4 illustrate respectively the successive steps of the method to be pursued in the production of the hose.

Figure 1:
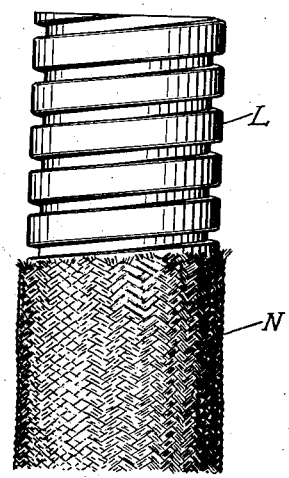
Figure 2:
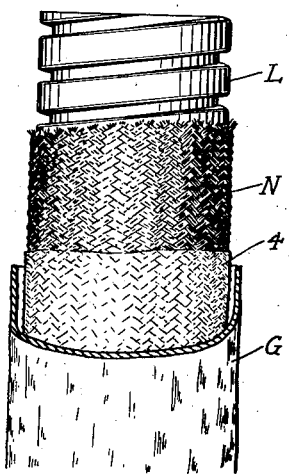

The various steps pursued in the manufacture of hose as above referred to may be described as follows:

Being provided with a suitable length of the flexible corrugated metallic tube, as L, the first operation is that of applying onto the outer surface of said tube, as by braiding or weaving thereonto, a layer of fabric to constitute the protecting element or guard N, as illustrated in Fig. 1.

After the guard N has been applied, the hose, as thus far completed, is introduced into a tube of suitable material for constituting the protecting layer or sheath G. This layer G may be formed at the time of its application about the hose, or at any time previously to its application. It preferably however, though not necessarily, is formed as a complete tubular element prior to its application and when in this form is slid or telescoped over the hose, and it is of such diametrical proportions with respect to the hose over which it is drawn or applied as to have only a very loose fit to said hose, as suggested by the illustration Fig. 2.

At the time of its application onto the hose the material of the layer G is in a relatively soft plastic condition, being relatively moist and in a sense uncured.

A period of time is now provided to permit the drying and curing of the material of the layer G, thereby causing or permitting it to shrink into a closer hugging relationship with respect to the surface of the guard layer N.

If the layer G be formed at the time of its application onto the hose it may be of a size to loosely fit the hose as above described or to more tightly fit the hose if preferred. In any event however it is preferably allowed to partly dry and shrink so as to more closely fit the surface of the guard layer N and be formed as a result of such fitting to correspond to some extent with the uneven surface contour of said guard layer.

Prior to enclosing the guard layer N within the tube or layer G a softening agency or a preservant as 4 is introduced as for instance by causing a quantity of glycerine or other appropriate material to be contained in or carried by the material of the guard layer N so that said softening agency will appear both on the inner surface of the guard layer N where said guard engages the metallic surface of the liner and on the outer surface of said guard layer where said guard layer engages, or is engaged by, the layer G.

Figure 3:
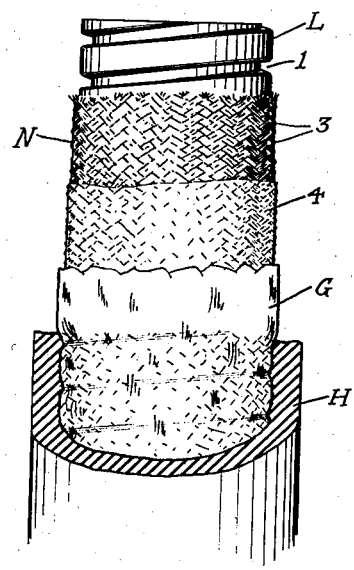

After the application of the layer G has been completed, and preferably after the layer G has shrunk somewhat, then the rubber covering H is applied preferably by being formed, as by exuding, directly onto and about the outer surface of the tube G, as indicated in Fig. 3.

Figure 4:
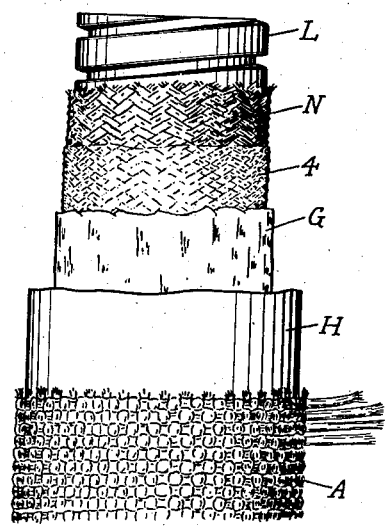

Following the application of the rubber covering H then the fabric covering A is applied, as indicated in Fig. 4, preferably by being woven directly onto the outer surface of the rubber covering H, thereby completing the hose It is intended that the application of the rubber covering H and of the fabric covering A about the layer G will exert a pressure against the outer surface of said layer G suitable to cause the material of said layer G and of the layer N to be forced to a desirably slight extent into the spaces between the corrugations of the metallic liner, and also suitable to cause the material of the layer G to be pressed into intimate contact with the surface of the guard layer N so as to be made to follow in cross section the multitude of ridges and depressions of the surface of said guard layer N and to take a relatively permanent set in this contour of course without destroying the resiliency and elasticity of the material of the layer G.

The outer annular surface of the guard N is not smooth, but is suitably rough to provide ridge-like formations as 3—3 more or less uniformly distributed thereon into and over which the layer G may sink and fit.

The layer or sheath G consists of a cellulose composition such as "Cellophane". It is only of sufficient thickness to afford ample bulk and body for convenient handling and for offering the requisite efficiency against penetration of gasoline or other liquids therethrough, being in practice usually much less than one-sixteenth inch thick. In the finished hose it closely hugs the guard layer N sinking into and about the depressions and ridges of the guard N so as to have a cross sectional contour following substantially the outer surface contour of said guard layer N, as clearly indicated in the drawing Fig. 3.

The material of the layer G in the finished hose is flexible and resilient so that it is capable of being extended, as on the convexed side of a bent hose, or condensed, as on the concaved side of a bent hose.

By reason of the elastic character of the material of the layer G, and the transversely corrugated cross sectional contour of said material following the outer surface contour of the layer N, the layer G is readily capable of extending or of condensing longitudinally of the hose whenever the hose is bent one way or the other. The ridges and depressions formed in the material of the layer G, by the forced contact of said material with the exterior surface of the layer N, together with the slightly corrugated surface of the layer N following the corrugations of the liner L, define a multitude of more or less uniformly distributed and independently bendable sections throughout the extent of the layer G said sections merely straightening out with respect to each other to provide the required increased length in the desired direction when the hose is flexed one way, and crowding together to reduce length when the hose is flexed in the opposite way.

The softening agency or preservant is introduced into the structure intended for preserving the flexibility and elasticity both of the layer N and the layer G, and for at the same time providing a lubricant between said layer N and the metallic exterior surface of the metallic liner so that the ridges of the liner may more easily slide and move along the opposing surface portions of the layer N. Any desired softening agency may be employed, such for instance as glycerine, and it may be applied in any suitable manner as for instance by being carried by the threads of the layer N, having been applied to said layer N either after its application onto the metallic liner L or at the time of its application, the material of the layer N being in any case substantially saturated with the softening agency so that the portion of said softening agency which is at the inner surface of the layer N contacts and provides a lubricant against the metallic surface of the liner, and the portion which is at the exterior surface of the layer N contacts the material of the layer G to constitute both a lubricant and a preservant for the material of said layer G suitable to materially prolong the life of said layer G.

The metallic liner at all times serves to reinforce the hose against collapse from external pressure and against acute flexing, and thus guards the layer G against damaging strains. It may be of any approved construction, that illustrated being of the well known standard type made from a single strip of thin sheet metal bent into S cross section and spiral form and having its convolutions overlapping and interlocked.

The rubber covering H may be of any desired consistency and thickness.

The outer fabric covering A preferably consists of coarse woven fabric or canvas being preferably woven directly about the rubber covering H, and being amply flexible and elastic to readily accommodate the bending or flexing movements of the hose. In the operation of applying it a sufficient tension is given to its component strands so that it operates to compress the rubber toward the metallic liner.

The protecting element or guard layer N is formed preferably of fabric, and may be of a braided type as indicated, or of a woven type if preferred. It is preferably of a somewhat finer texture however than the fabric covering A, the component strands being of smaller diameter than the component strand of the covering A. It is also preferably somewhat softer than the fabric A so that it offers a more resilient cushion between the gasoline proof layer G and the metallic surface of the liner.

This guard element N is amply flexible and elastic to readily accommodate the bending and flexing movements of the hose. It bridges from ridge to ridge along the liner and acts as a resilient support to hold the layer against sinking so far into the grooves of the metallic liner as to be pinched between the opposing wall of the grooves when the hose is flexed.

As the various steps herein proposed with respect to this method may be modified within certain limits without departing from the scope of the invention as defined in the following claims, it is intended that all matter contained in the above description or shown in the accompanying drawing shall be interpreted as illustrative only and not in a limiting sense.

Having thus described my invention, what I claim as new and desire to secure by Letters Patent is:—

1. The herein described method of producing a gasoline hose, which method consists in providing an inner tubular member having a tubular fabric cover thereon, impregnating said cover with a quantity of material to serve as a plasticizer for a gasoline proof sheath to be applied over said cover, applying said gasoline proof sheath over said cover, applying a rubber cover over said sheath in a manner to hold the sheath in firm engagement with said impregnated cover, and finally applying an outer cover to press and hold the rubber against the sheath.

2. The herein described method of producing a gasoline hose, which method consists in providing an inner tubular member having a tubular fabric cover thereon, impregnating said cover with a quantity of material to serve as a plasticizer for a gasoline proof sheath to be applied over said cover, applying said gasoline proof sheath in tubular form loosely over said cover, applying a rubber cover over said tubular sheath in a manner to reduce the diameter of said tubular sheath and press the sheath against the surface of the impregnated cover, and finally applying an outer cover to press and hold the rubber against the sheath.

3. The herein described method of producing a gasoline hose, which method consists in providing an inner tubular member having a tubular fabric cover thereon, telescoping said covered inner tubular member relatively into a tubular gasoline proof sheath which is normally too large to tightly fit said covered inner tubular member but which will shrink closer to said covered tubular member after the telescoping operation, allowing said sheath to shrink, and then applying a protecting cover over said sheath in a manner to press the sheath into tight and intimate surface contact with the cover of said inner tubular member.

4. The herein described method of producing a gasoline hose, which method consists in providing an inner tubular member having a tubular fabric cover thereon having a rough outer surface, telescoping said covered inner tubular member relatively into a tubular gasoline proof sheath which is normally too large to tightly fit said covered inner tubular member but which will shrink closer to said covered tubular member after the telescoping operation, allowing said sheath to shrink, and then applying a protecting cover over said sheath in a manner to press the sheath into tight and intimate surface contact with the cover of said inner tubular member to thereby make said sheath of a cross sectional contour mating the contour of the rough surface of the cover of said inner tubular member.

5. The method of producing a hose for conveying hydrocarbons such as gasoline and the like, which method consists in providing an inner tubular member, telescoping said tubular member into a tubular hydrocarbon proof sheath which is too large to tightly fit said inner tubular member but which will shrink closer to said tubular member after the telescoping operation, permitting said sheath to shrink and then applying a cover over said sheath.

6. The method of producing a hose for conveying hydrocarbons such as gasoline and the like, which method consists in providing an inner tubular member comprising a metal liner for the hose, telescoping said tubular member into a tubular sheath of cellulose material which is normally too large to tightly fit said inner tubular member but which will shrink closer thereto after the telescoping operation, allowing said sheath to shrink and then applying a rubber covering outside said sheath.

ROBERT BERKOWITZ.